US011425031B2

(12) United States Patent
Nandy et al.

(10) Patent No.: US 11,425,031 B2
(45) Date of Patent: Aug. 23, 2022

(54) LAYER 3 MULTI-CHASSIS LINK AGGREGATION GROUP

(71) Applicant: Hewlett Packard Enterprise Development LP, Houston, TX (US)

(72) Inventors: Tathagata Nandy, Bangalore Karnataka (IN); Venkatavaradhan Devarajan, Bangalore Karnataka (IN); Mithun Kumar Halder, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/368,192

(22) Filed: Mar. 28, 2019

(65) Prior Publication Data

US 2020/0314003 A1   Oct. 1, 2020

(51) Int. Cl.
*H04L 45/24* (2022.01)
*H04L 69/14* (2022.01)
*H04L 69/325* (2022.01)
*H04L 61/5007* (2022.01)
*H04L 45/74* (2022.01)
*H04L 61/103* (2022.01)
*H04L 45/58* (2022.01)
*H04L 12/46* (2006.01)

(52) U.S. Cl.
CPC .......... *H04L 45/245* (2013.01); *H04L 45/58* (2013.01); *H04L 45/74* (2013.01); *H04L 61/103* (2013.01); *H04L 61/2007* (2013.01); *H04L 69/14* (2013.01); *H04L 69/325* (2013.01); *H04L 12/4633* (2013.01)

(58) Field of Classification Search
None
See application file for complete search history.

(56) References Cited

U.S. PATENT DOCUMENTS

| 8,767,735 | B2* | 7/2014 | Jacob Da Silva .... H04L 45/586 370/392 |
| 8,787,149 | B1 | 7/2014 | Ramanathan et al. |
| 9,019,814 | B1* | 4/2015 | Mohanty ................. H04L 41/08 370/219 |
| 9,264,302 | B2 | 2/2016 | Ernstrom et al. |

(Continued)

OTHER PUBLICATIONS

Hein Sebastian, "Best Practice—ArubaOS-CX", (Web Page). Retrieved Dec. 20, 2018, 18 pages.

(Continued)

*Primary Examiner* — Jutai Kao
(74) *Attorney, Agent, or Firm* — Hewlett Packard Enterprise Patent Department

(57) ABSTRACT

Examples disclosed herein relate to establishing a layer 3 (L3) Multi-Chassis Link Aggregation Group (MC-LAG). In an example, a common IP address and a common MAC address may be associated with a primary network device and a secondary network device. A layer 3 MC-LAG may be established in a multi-homing configuration between the primary network device and the secondary network device to provide a redundant L3 connectivity to a core network device in a network. A dedicated communication link may be established between the primary network device and the secondary network device, for the primary network device and the secondary network device to share network packets.

17 Claims, 6 Drawing Sheets

(56) References Cited

U.S. PATENT DOCUMENTS

| | | | |
|---|---|---|---|
| 9,338,055 B2 | 5/2016 | Choorakkot et al. | |
| 9,985,875 B1* | 5/2018 | Srinath | G06F 11/1451 |
| 10,554,494 B1* | 2/2020 | Thakor | H04L 41/0873 |
| 2012/0033668 A1* | 2/2012 | Humphries | H04L 45/245 |
| | | | 370/390 |
| 2013/0182581 A1* | 7/2013 | Yeung | H04L 49/201 |
| | | | 370/244 |
| 2014/0204761 A1* | 7/2014 | Durrani | H04L 47/125 |
| | | | 370/236 |
| 2014/0269746 A1* | 9/2014 | Chinthalapati | H04L 45/50 |
| | | | 370/409 |
| 2014/0286345 A1* | 9/2014 | Mohandas | H04L 49/25 |
| | | | 370/401 |
| 2014/0369186 A1* | 12/2014 | Ernstrom | H04L 45/586 |
| | | | 370/228 |
| 2014/0369230 A1* | 12/2014 | Nallur | H04L 45/02 |
| | | | 370/254 |
| 2016/0094436 A1* | 3/2016 | Elder | H04L 47/805 |
| | | | 370/225 |
| 2016/0094443 A1* | 3/2016 | Arumugam | H04L 12/1854 |
| | | | 370/390 |
| 2016/0094489 A1* | 3/2016 | Ramesh | H04L 45/245 |
| | | | 370/218 |
| 2016/0119229 A1* | 4/2016 | Zhou | H04L 12/4641 |
| | | | 370/392 |
| 2016/0255043 A1* | 9/2016 | Mahadevan | H04L 61/103 |
| | | | 709/245 |
| 2017/0163473 A1* | 6/2017 | Sadana | H04L 47/125 |
| 2017/0257309 A1* | 9/2017 | Appanna | H04L 12/4633 |
| 2018/0302315 A1* | 10/2018 | Kamisetty | H04L 12/462 |
| 2019/0166048 A1* | 5/2019 | Srinivasan | H04L 45/586 |
| 2019/0182202 A1* | 6/2019 | Garcia Del Rio | H04L 45/245 |
| 2019/0222509 A1* | 7/2019 | Zhang | H04L 47/125 |
| 2019/0230031 A1* | 7/2019 | Mahishi | G06F 9/545 |
| 2019/0230052 A1* | 7/2019 | Jailani | H04L 49/3054 |

OTHER PUBLICATIONS

"Understanding Multichassis Link Aggregation Groups", (Web Page), Juniper Networks Inc., Nov. 7, 2018, 23 pages.

"Junos OS: Multichassis Link Aggregation Feature Guide for EX Series, MX Series, and QFX Series Devices", (Web Page), Juniper Networks Inc., Nov. 7, 2018, 510 pages.

"High Availability in Layer 3 Networks Using VRRP and MAC Address Synchronization for MC-LAG", (Web Page), Juniper Networks Inc., Sep. 27, 2018, 260 pages.

* cited by examiner

LAYER 3 MULTI-CHASSIS LINK AGGREGATION GROUP

BACKGROUND

Computer networks form the foundation of an organization's information technology (IT) infrastructure. Considering their importance, computer networks are expected to have high availability and scalability. In the seven-layer Open Systems Interconnection model (OSI model) of computer networking, layer 3 is the network layer. The network layer is responsible for packet forwarding including routing through intermediate routers.

BRIEF DESCRIPTION OF THE DRAWINGS

For a better understanding of the solution, examples will now be described, with reference to the accompanying drawings, in which.

DETAILED DESCRIPTION

The network layer (or layer 3 (L3)) provides the mechanism of transferring network packets from a source to a destination host via one or more networks. Within the OSI network architecture, the network layer responds to service requests from the transport layer and issues service requests to the data link layer. A number of layer-management protocols belong to the network layer. These include routing protocols, multicast group management, network-layer information and error, and network-layer address assignment.

Link aggregation, which is defined by the IEEE 802.1AX-2008 standard, is a method of grouping multiple Ethernet ports into a virtual link. The set of ports in a link aggregation group (LAG) are treated as a single port, such that a MAC client may treat the Link Aggregation Group as if it were a single link. This increases bandwidth and provides redundancy.

Multi-Chassis Link Aggregation Group (MC-LAG) is a type of LAG with constituent ports that terminate on separate chassis, primarily for the purpose of providing redundancy in the event one of the chassis fails. MC-LAG adds node-level redundancy to the normal link-level redundancy that a LAG provides. This allows two or more nodes to share a common LAG endpoint. The multiple nodes present a single logical LAG to a remote end.

Majority of the aggregation to core connections use L3 links, for example, for optimal traffic forwarding, better resiliency and zero risk of network loops. But support for routed L3 MC-LAGs is lacking.

To address these technical challenges, the present disclosure describes various examples for establishing a layer 3 (L3) MC-LAG. In an example, a common IP address and a common MAC address may be associated with a primary network device and a secondary network device. A layer 3 MC-LAG may be established in a multi-homing configuration between the primary network device and the secondary network device to provide a redundant L3 connectivity to a core network device in a network. A dedicated communication link may be established between the primary network device and the secondary network device, for the primary network device and the secondary network device to share network packets.

Figure 1:
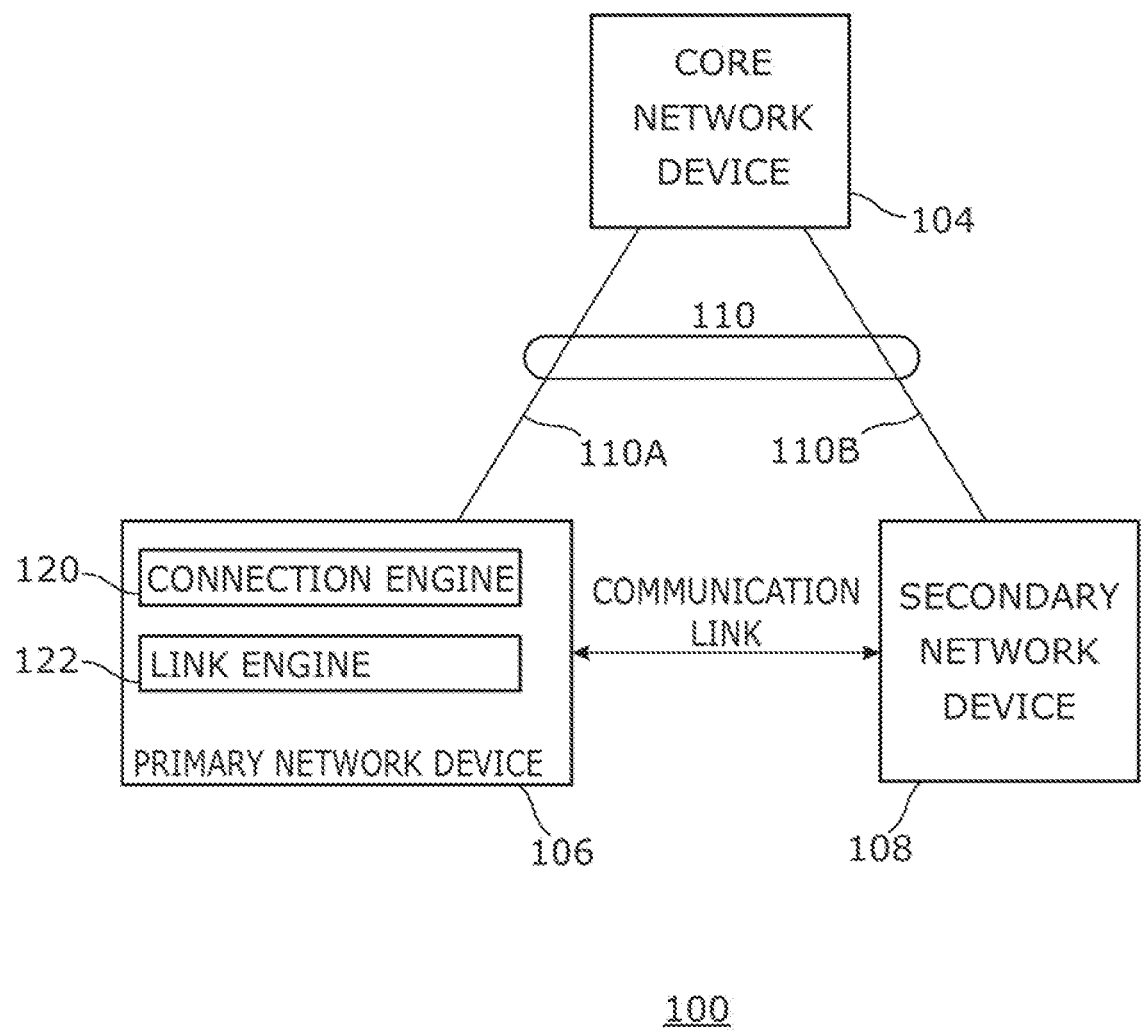
FIG. 1 is a block diagram of an example computing environment for establishing a layer 3 (L3) Multi-Chassis Link Aggregation Group (MC-LAG)

FIG. 1 is a diagram of an example computing environment 100 for establishing a layer 3 (L3) Multi-Chassis Link Aggregation Group (MC-LAG). Computing environment 100 may include a core network device 104, a primary network device 106, and a secondary network device 108. Although three network devices are shown in FIG. 1, other examples of this disclosure may include more than three network devices.

Core network device 104, primary network device 106, and secondary network device 108 may be communicatively coupled over a direct link or a computer network. The computer network may be a wireless or wired network. The computer network may include, for example, a Local Area Network (LAN), a Wireless Local Area Network (WAN), a Campus Area Network (CAN), or the like. Further, the computer network may be a public network (for example, the Internet) or a private network (for example, an intranet). In an example, the computer network may be an IP network. Core network device 104, primary network device 106, and secondary network device 108 may each be, for example, a network router, a network switch, or an L3 network device with L2 functionality.

In an example, core network device 104 may be a part of a backbone area or core of a network. All other areas may be connected to it, either directly or through other routers. Inter-area routing may occur through routers connected to the backbone area and to their own associated areas. The backbone area is responsible for distributing routing information between non-backbone areas.

In an example, primary network device 106, and secondary network device 108 may each be a provider edge (PE) router that may be located at an edge of a service provider network. Primary network device 106, and secondary network device 108 may interface with a customer edge (CE) router (not shown) that may be located at an edge of a customer network.

In an example, from a management or control plane perspective, primary network device 106, and secondary network device 108 may be in an active-standby configuration. In an active-standby configuration, primary network device 106 may act as the active device that may be used to route traffic to both upstream and downstream devices. In an active-standby configuration, if the primary network device 106 fails, the secondary network device 108 may take over the role and functionality of the primary network device 106 from a management or control plane perspective. In an active-active configuration, both the primary network device 106 and the secondary network device 108 may be used to route traffic to both upstream and downstream devices.

In an example, primary network device 106 and secondary network device 108 may provide redundant L3 network connectivity to core network device 104 via multi-chassis link aggregation group (MC-LAG) links. This may be referred to as multi-homing, which may be defined as the practice of connecting a host or a computer network to more than one network. This may be done, for example, to increase reliability or performance. In the present example, core network device 104 may be provided redundant connectivity to a network through primary network device 106 and secondary network device 108. Thus, core network device 104 may be multi-homed to a network via primary network device 106 and secondary network device 108.

In an example, a common IP address may be associated with primary network device 106 and secondary network device 108. In an example, associating a common IP address may comprise programming a common IP address in respective kernels of primary network device 106 and secondary network device 108. In an example, associating a common IP address may comprise programming a common IP address in respective Application-specific Integrated Circuits (ASICS) on primary network device 106 and secondary network device 108. In an example, a common Media Access Control (MAC) address may be associated with primary network device 106 and secondary network device 108. In an example, associating a common MAC address may comprise programming a common MAC address on primary network device 106 and secondary network device 108.

In an example, primary network device 106 and secondary network device 108 may be in an active-standby configuration. Since both primary network device 106 and secondary network device 108 may share a common IP address, from a control plane perspective, primary network device 106 may use the IP address for generating network packets, in an active-standby configuration. But from a data plane perspective (e.g., traffic forwarding), both primary network device 106 and secondary network device 108 may participate in handling data traffic. From a control plane standpoint, if primary network device 106 fails, secondary network device 108 may use the same ROUTER-ID and IP address, and run a standards-based Graceful Restart procedure to re-sync with its peers (e.g., core network device).

In an example, a layer 3 (L3) multi-chassis link aggregation group (MC-LAG) in a multi-homing configuration may be established between primary network device 106 and secondary network device 108 to provide a redundant L3 connectivity to core network device 104 in a network.

Primary network device 106 and secondary network device 108 may provide a multi-chassis LAG 110 for multi-chassis LAG links 110A and 110B to core network device 104. In an example, core network device 104, primary network device 106, and secondary network device 108 may each run Link Aggregation Control Protocol (LACP) to bundle interfaces associated with multi-chassis LAG links 110A and 110B. The bundle may be treated as a single logical interface for L3 forwarding.

In an example, a dedicated communication link may be established between the primary network device 106 and the secondary network device 108, for the primary network device 106 and the secondary network device 108 to share network packets. Although both primary network device 106 and secondary network device 108 may share a common IP address, and run independent control planes, a recipient network device (e.g., primary network device 106 or secondary network device 108) may share packets received by it with the other network device (e.g., primary or secondary network device 108, as the case may be). In an example, the packets may be transferred through a dedicated virtual LAN (VLAN) on Inter-Switch Link (ISL). In an example, primary network device 106, and secondary network device 108 may each run Inter-Switch Link (ISL) to establish inter-chassis communication. ISL protocol may be use to maintain VLAN information in Ethernet frames as traffic flows between primary secondary network and secondary network device 108. Primary network device 106 and secondary network device 108 may communicate L3 packets received from multi-chassis LAG to each other on ISL.

In another example, a recipient network device (e.g., primary network device 106 or secondary network device 108) may share packets received by it with the other network device (e.g., primary or secondary network device 108, as the case may be) through a MAC-in-MAC tunnel. MAC-in-MAC is a set of protocols for routing over a provider's network that allows interconnection of multiple Provider Bridge Networks without losing each customer's individually defined VLAN. A MAC-in-MAC may allow the identity of an equipment to be hidden by allowing use of a user-specified MAC address as the tunnel source address. In an example, primary network device 106 and secondary network device 108 may communicate L3 packets received from multi-chassis LAG to each other over a MAC-in-MAC tunnel.

In an example, Open Shortest Path First (OSPF) routing protocol may be run on the primary network device. In such case, if secondary network device 108 receives an OSPF packet from core network device, it may bridge the OSPF packet to primary network device 106 over the dedicated communication link. Likewise, if OSPF is run on secondary network device 108, and if primary network device 106 receives an OSPF packet from core network device, it may bridge the OSPF packet to secondary network device 108 over the dedicated communication link. Thus, a route learned through OSPF may be synchronized between the primary network device 106 and the secondary network device 108, for example, via a forwarding information base (FIB)-sync over the dedicated communication link.

In an example, Border Gateway Protocol (BGP) routing protocol may be run on the primary network device. In such case, if secondary network device 108 receives a BGP packet from core network device, it may bridge the BGP packet to primary network device 106 over the dedicated communication link. Likewise, if BGP is run on secondary network device 108, and if primary network device 106 receives a BGP packet from core network device, it may bridge the BGP packet to secondary network device 108 over the dedicated communication link. Thus, a route learned through BGP may be synchronized between the primary network device 106 and the secondary network device 108, for example, via a FIB-sync over the dedicated communication link.

In an example, an Address Resolution Protocol (ARP) request from core network device 104 for the shared IP address may be addressed by a recipient device i.e. network device that receives the request (e.g., primary network device 106 and secondary network device 108). In an example, a Neighbor Discover (ND) request from core network device 104 for the shared IP address may be addressed by a recipient device i.e. network device that receives the request (e.g., primary network device 106 and secondary network device 108). If primary or secondary network device 108 is to generate an ARP or ND request for a device, it may use the shared IP or MAC address as its source, and the generating device may bridge the ARP response to the other network device (e.g., primary or secondary network device 108, as the case may be) over the dedicated communication link.

In an example, Protocol-independent Multicast (PIM) may be run on primary network device 106 or secondary network device 108. In such case, the network device (e.g. primary or secondary network device 108) that runs the PIM may act as a Designated Router (DR) for downstream subnets and their Internet Group Management Protocol (IGMP) groups.

Figure 2:
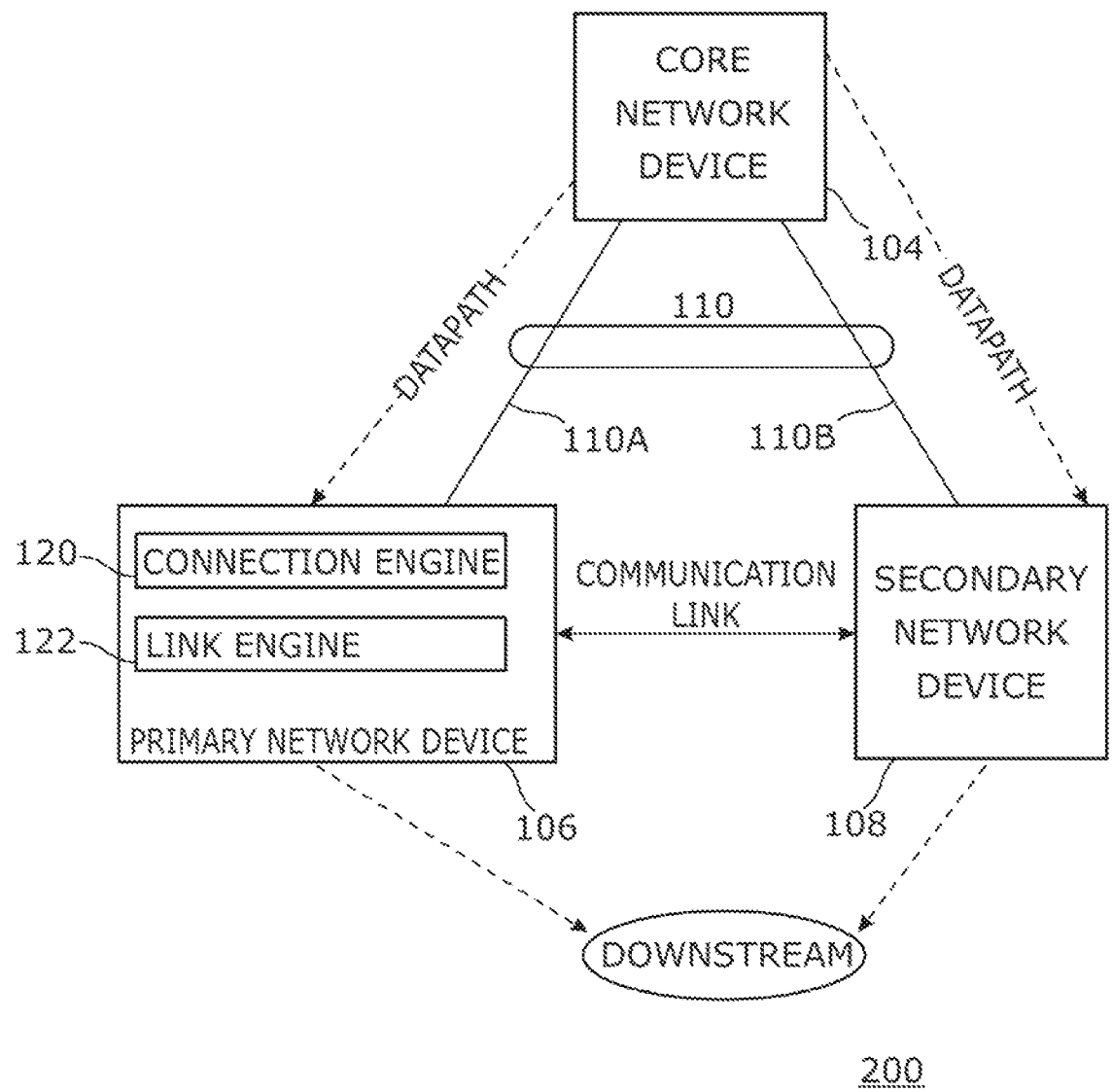
FIG. 2 is a block diagram of an example computing environment illustrating a unicast datapath in a L3 MC-LAG.

In an example, for unicast traffic forwarding, primary network device 106 and secondary network device 108 may considered to be in an active-active configuration. A recipient network device (e.g., primary or secondary network device 108) that receives packets from the downstream or upstream devices may route them over to the other network device (e.g., primary or secondary network device 108, as the case may be) via the dedicated communication link. This is illustrated in FIG. 2.

Figure 3:
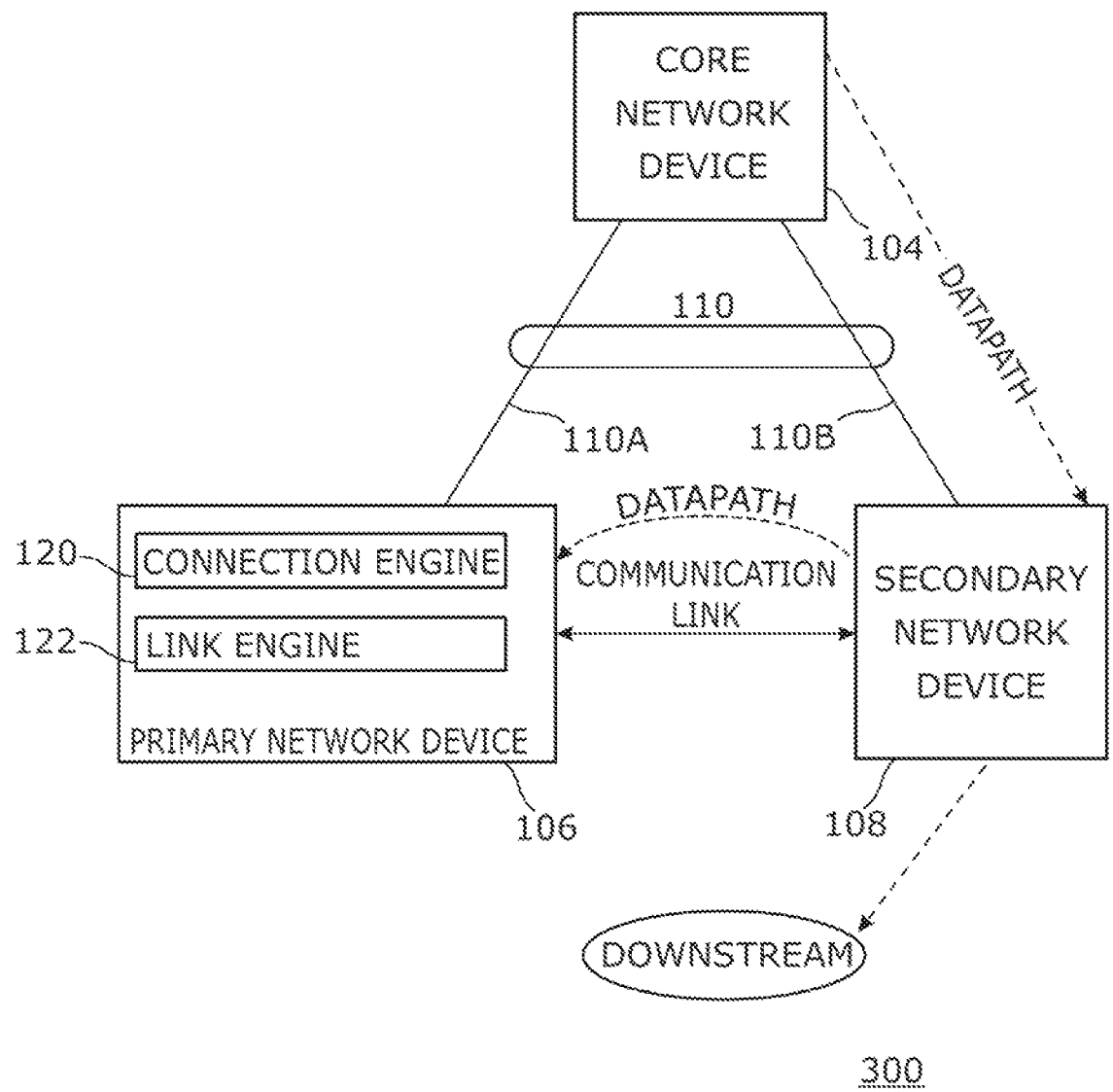
FIG. 3 is a block diagram of an example computing environment illustrating a multicast datapath in a L3 MC-LAG.

In an example, for multicast traffic, the network device (e.g. primary or secondary network device 108) that runs the PIM may act as a Designated Router (DR). The PIM DR device may receive multicast streams from the rendezvous point (RP) or source. The PIM DR device may route the multicast streams to all destinations and also route them over to the other network device (e.g., primary or secondary network device 108, as the case may be) via the dedicated communication link. This is illustrated in FIG. 3.

In an example, one of primary network device 106 or secondary network device 108 may include a connection engine 120 and a link engine 122.

Engines 120 and 122 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of primary network device 106 or secondary network device 108. In some examples, the at least one machine-readable storage medium may store instructions that, when executed by the at least one processing resource, at least partially implement some or all engines of primary network device 106 or secondary network device 108. In such examples, primary network device 106 or secondary network device 108 may include the at least one machine-readable storage medium storing the instructions and the at least one processing resource to execute the instructions.

In an example, primary network device 106 and secondary network device 108 may share a common Internet Protocol (IP) address and a common Media Access Control (MAC) address. Connection engine may establish a layer 3 (L3) multi-chassis link aggregation group (MC-LAG) in a multi-homing configuration between primary network device 106 and secondary network device 108 to provide a redundant L3 connectivity to a core network device 104 in a network. Link engine may establish a dedicated communication link between primary network device 106 and secondary network device 108, for primary network device 106 and secondary network device 108 to share network packets.

Figure 4:
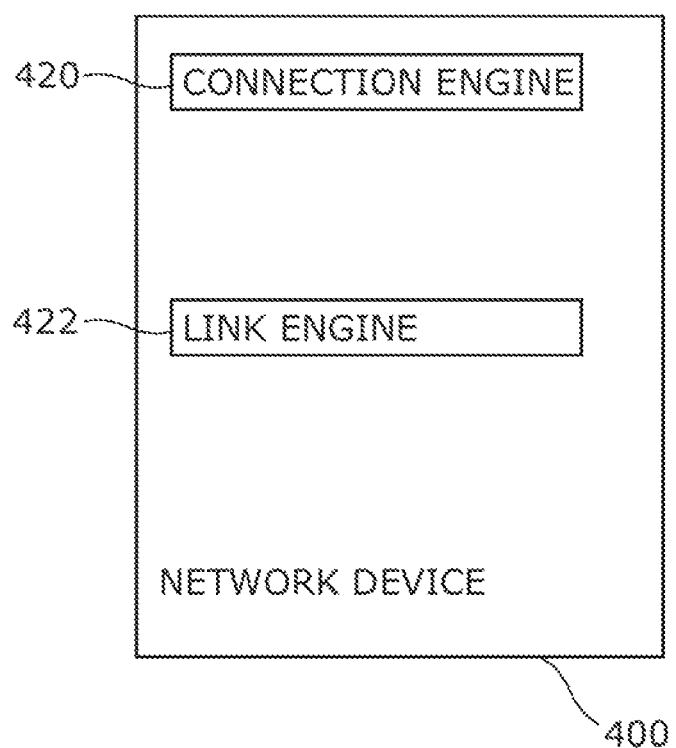
FIG. 4 is a block diagram of an example network device for establishing a L3 MC-LAG.

FIG. 4 is a block diagram of an example network device 400 for establishing a L3 MC-LAG.

In an example, network device 400 may be analogous to primary network device 106 of FIG. 1, in which like reference numerals correspond to the same or similar, though perhaps not identical, components. For the sake of brevity, components or reference numerals of FIG. 4 having a same or similarly described function in FIG. 1 are not being described in connection with FIG. 4. Said components or reference numerals may be considered alike.

Network device 400 may include, for instance, a network router, a virtual router, a network switch, or a L3 network device with L2 functionality.

In the example of FIG. 4, network device 400 may include a connection engine 420 and a link engine 422. In an example, connection engine 420 and link engine 422 may perform functionalities as described in respect of connection engine 120 and link engine 122 of FIG. 1.

In an example, network device 400 may share a common Internet Protocol (IP) address and a common Media Access Control (MAC) address with a peer network device (e.g., secondary network device 108). In an example, network device 400 may identify a peer network device by sending a special packet. For instance, in case of OSPF, network device 400 may identify its neighbors and form adjacencies by sending out hello packets from its OSPF-enabled interfaces.

Connection engine 420 may establish a layer 3 (L3) multi-chassis link aggregation group (MC-LAG) in a multi-homing configuration between network device 400 and peer network device to provide a redundant L3 connectivity to a core network device in a network. Link engine 422 may establish a dedicated communication link between network device and peer network device, for network device and peer network device to share network packets.

Figure 5:
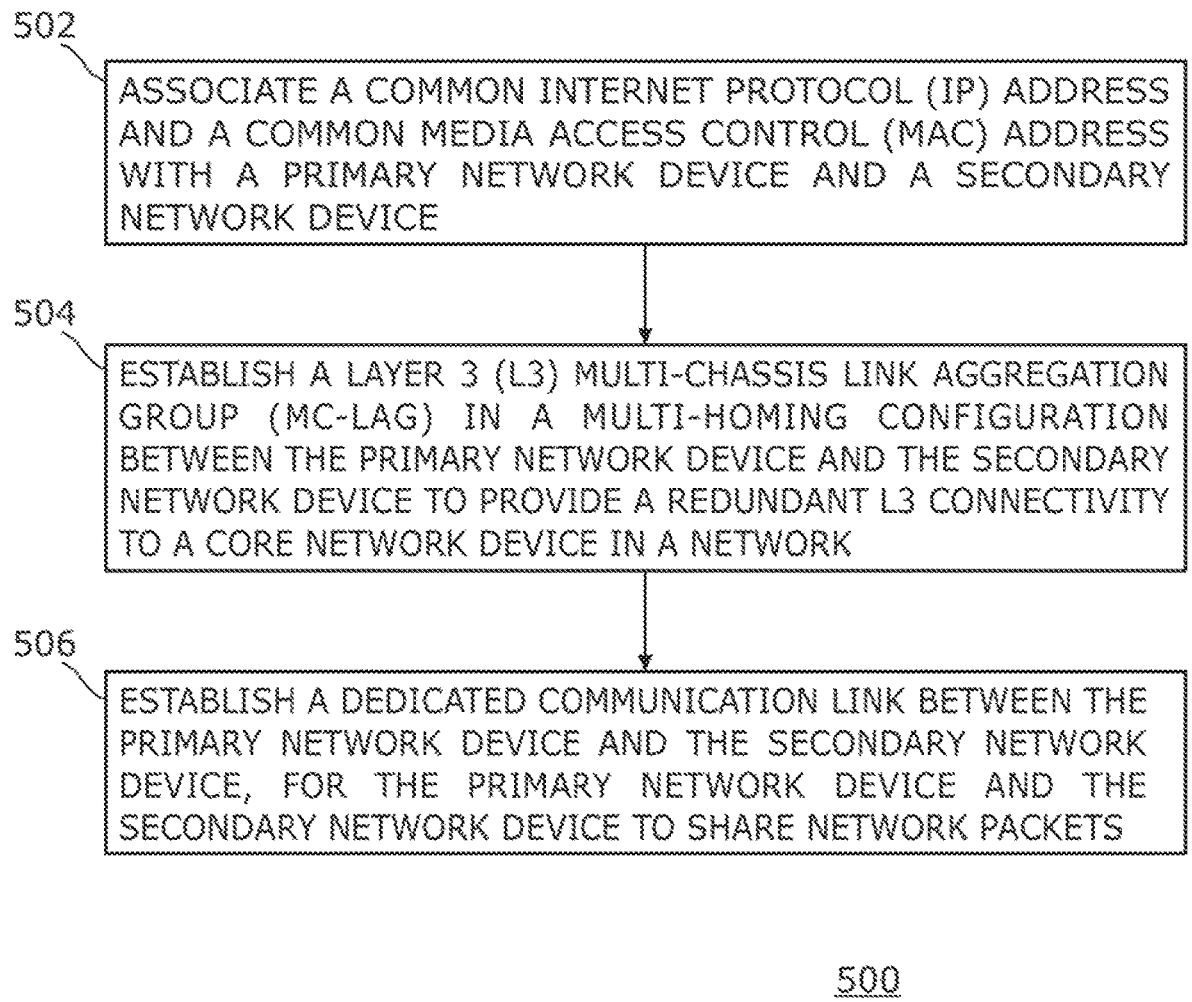
FIG. 5 is a block diagram of an example method of establishing a L3 MC-LAG.

FIG. 5 is a block diagram of an example method 500 of establishing a L3 MC-LAG. The method 500, which is described below, may be partially executed on a computing device such as network device 106 of FIG. 1 or network device 400 of FIG. 4. However, other suitable network devices may execute method 500 as well. At block 502, a common IP address and a common MAC address may be associated with a primary network device and a secondary network device. At block 504, a layer 3 MC-LAG may be established in a multi-homing configuration between the primary network device and the secondary network device to provide a redundant L3 connectivity to a core network device 104 in a network. At block 506, a dedicated communication link may be established between the primary network device and the secondary network device, for the primary network device and the secondary network device to share network packets.

Figure 6:
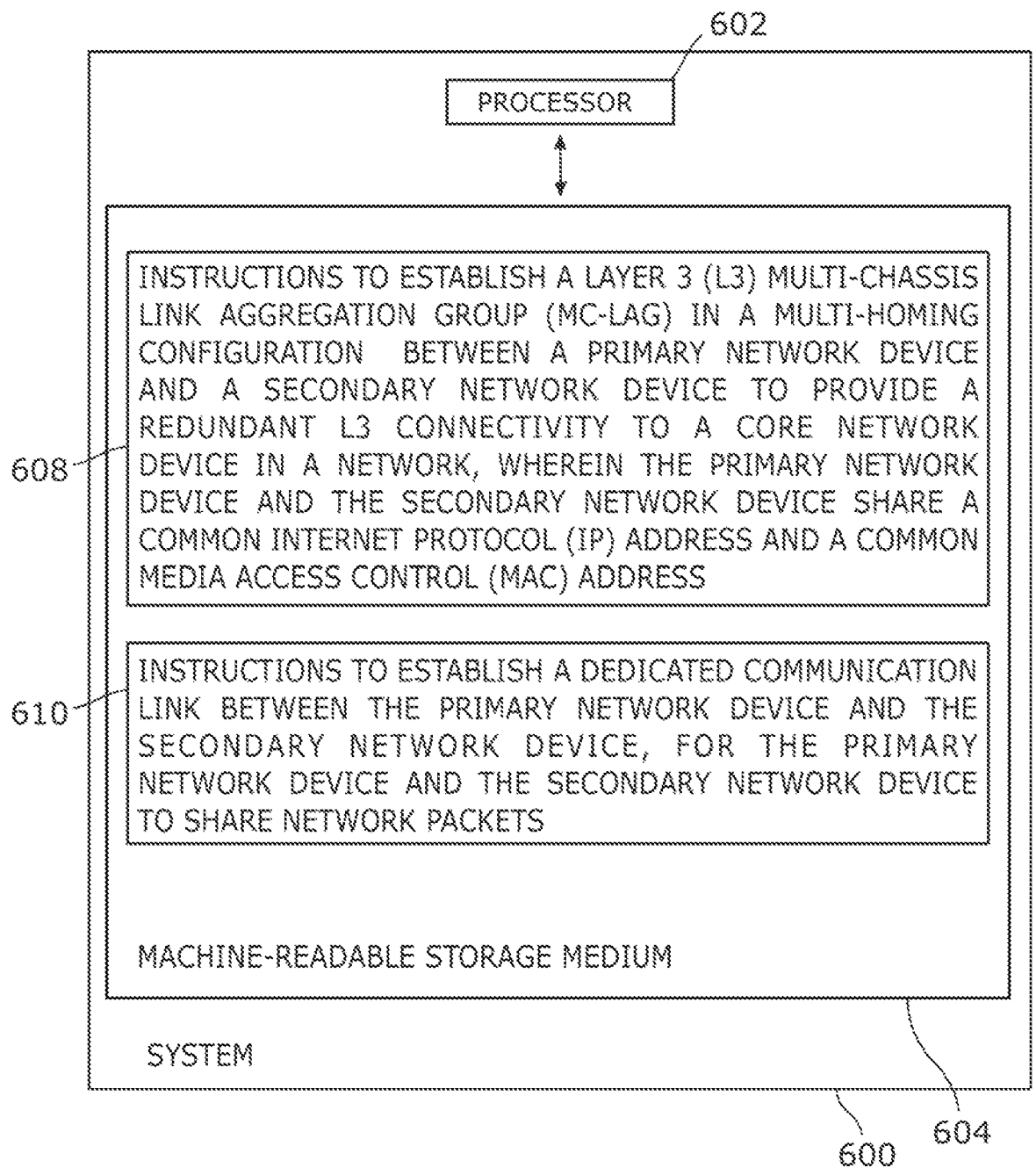
FIG. 6 is a block diagram of an example system including instructions in a machine-readable storage medium for establishing a L3 MC-LAG.

FIG. 6 is a block diagram of an example system 600 including instructions in a machine-readable storage medium for establishing a L3 MC-LAG. System 600 includes a processor 602 and a machine-readable storage medium 604 communicatively coupled through a system bus. In an example, system 600 may be analogous to network device 106 of FIG. 1, or network device 400 of FIG. 4. Processor 602 may be any type of Central Processing Unit (CPU), microprocessor, or processing logic that interprets and executes machine-readable instructions stored in machine-readable storage medium 604. Machine-readable storage medium 604 may be a random access memory (RAM) or another type of dynamic storage device that may store information and machine-readable instructions that may be executed by processor 602. For example, machine-readable storage medium 604 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium.

Machine-readable storage medium 604 may store instructions 606 and 608. In an example, instructions 606 may be executed by processor 602 to establish a layer 3 MC-LAG in a multi-homing configuration between a primary network device and a secondary network device to provide a redundant L3 connectivity to a core network device 104 in a network, wherein the primary network device and the secondary network device share a common Internet Protocol (IP) address and a common Media Access Control (MAC) address. Instructions 608 may be executed by processor 602 to establish a dedicated communication link between the primary network device and the secondary network device, for the primary network device and the secondary network device to share network packets.

For the purpose of simplicity of explanation, the example method of FIG. 5 is shown as executing serially, however it is to be understood and appreciated that the present and other examples are not limited by the illustrated order. The example systems of FIGS. 1, 2, 3, 4, and 6, and method of FIG. 5 may be implemented in the form of a computer program product including computer-executable instructions, such as program code, which may be run on any suitable computing device in conjunction with a suitable operating system (for example, Microsoft Windows), Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

The invention claimed is:

1. A method, comprising:
 associating a common Internet Protocol (IP) address and a common Media Access Control (MAC) address with a first network device, wherein the common IP address and the common MAC address is further associated with a second network device,
  wherein the first network device and the second network device are in an active-active configuration for forwarding data traffic and in an active-standby configuration for forwarding control traffic in the network;
 establishing, by the first network device in conjunction with the second network device, a layer-3 multi-chassis link aggregation group (MC-LAG) in a multi-homing configuration to provide a redundant layer-3 connectivity to a core network device in a network, wherein the layer-3 MC-LAG facilitates a combined layer-3 interface;
 determining a layer-3 route via the layer-3 MC-LAG to the core network device based on the multi-homing configuration; and
 establishing a dedicated communication link between the first and second network devices for sharing network packets.

2. The method of claim 1, wherein determining the layer-3 route further comprises running an Open Shortest Path First (OSPF) routing protocol on one of the first and second network devices.

3. The method of claim 2, further comprising synchronizing the layer-3 route learned through the OSPF routing protocol between the first and second network devices via the dedicated communication link.

4. The method of claim 1, wherein determining the layer-3 route further comprises running a Border Gateway Protocol (BGP) routing protocol on one of the first and second network devices.

5. The method of claim 4, further comprising synchronizing the layer-3 route learned through the BGP routing protocol between the first and second network devices via the dedicated communication link.

6. The method of claim 1, further comprising:
 running a Protocol-Independent Multicast (PIM) instance on the first network device, wherein the first network device operates as a multicast Designated Router (DR) for a downstream subnet.

7. The method claim 1, wherein an Address Resolution Protocol (ARP) request or a Neighbor Discover (ND) request from the core network device is addressed by a recipient device of the network device and the second network device.

8. The method claim 1, wherein the dedicated communication link is one or more of: a virtual LAN (VLAN) on an Inter-Switch Link (ISL) and a MAC-in-MAC tunnel.

9. A network device, comprising:
 a connection engine to:
  establish, in conjunction with a second network device, a layer-3 multi-chassis link aggregation group (MC-LAG) in a multi-homing configuration to provide a redundant layer-3 connectivity to a core network device in a network, wherein the layer-3 MC-LAG facilitates a combined layer-3 interface, and wherein a common Internet Protocol (IP) address and a common Media Access Control (MAC) address are allocated to the first and second network devices,
   wherein the network device and the second network device are in an active-active configuration for forwarding data traffic and in an active-standby configuration for forwarding control traffic in the network; and
  determine a layer-3 route via the layer-3 MC-LAG to the core network device based on the multi-homing configuration; and
 a link engine to establish a dedicated communication link with the second network device for sharing network packets.

10. The network device of claim 9, wherein an Address Resolution Protocol (ARP) request or a Neighbor Discover (ND) request from the core network device is addressed by a recipient device of the network device and the second network device.

11. The network device of claim 9, wherein determining the layer-3 route further comprises:
    running routing protocol on one of the first and second network devices, wherein the routing protocol includes one or more of: an Open Shortest Path First (OSPF) protocol and a Border Gateway Protocol (BGP); and
    synchronizing the layer-3 route learned through the routing protocol between the first and second network devices via the dedicated communication link.

12. The network device of claim 9, wherein the dedicated communication link is one or more of: a virtual LAN (VLAN) on an Inter-Switch Link (ISL) and a MAC-in-MAC tunnel.

13. A non-transitory machine-readable storage medium storing instructions that upon execution cause a processor to:
    associate a common Internet Protocol (IP) address and a common Media Access Control (MAC) address with a first network device, wherein the common IP address and the common MAC address is further associated with a second network device,
        wherein the first network device and the second network device are in an active-active configuration for forwarding data traffic and in an active-standby configuration for forwarding control traffic in the network;
    establish, by the first network device in conjunction with the second network device, a layer-3 multi-chassis link aggregation group (MC-LAG) in a multi-homing configuration to provide a redundant layer-3 connectivity to a core network device in a network, wherein the layer-3 MC-LAG facilitates a combined layer-3 interface;
    determine a layer-3 route via the layer-3 MC-LAG to the core network device based on the multi-homing configuration; and
    establish a dedicated communication link between the first and second network devices for sharing network packets.

14. The storage medium of claim 13, wherein the dedicated communication link is one or more of: a virtual LAN (VLAN) on an Inter-Switch Link (ISL) and a MAC-in-MAC tunnel.

15. The storage medium of claim 13, wherein determining the layer-3 route further comprises:
    running routing protocol on one of the first and second network devices, wherein the routing protocol includes one or more of: an Open Shortest Path First (OSPF) protocol and a Border Gateway Protocol (BGP); and
    synchronizing the layer-3 route learned through the routing protocol between the first and second network devices via the dedicated communication link.

16. The storage medium of claim 13, wherein the instructions upon execution cause the processor further to run a Protocol-Independent Multicast (PIM) instance on the first network device, wherein the first network device operates as a multicast Designated Router (DR) for a downstream subnet.

17. The storage medium of claim 13, wherein an Address Resolution Protocol (ARP) request or a Neighbor Discover (ND) request from the core network device is addressed by a recipient device of the network device and the second network device.

* * * * *